United States Patent

[11] 3,612,275

| [72] | Inventor | Robert Ernst Carl Herbert Tiepel<br>Zevenaar, Netherlands |
|---|---|---|
| [21] | Appl. No. | 767,656 |
| [22] | Filed | Oct. 15, 1968 |
| [45] | Patented | Oct. 12, 1971 |
| [73] | Assignee | Lever Brothers Company<br>New York, N.Y. |

[54] APPARATUS FOR THE TREATMENT OF VEGETABLES
7 Claims, 3 Drawing Figs.

[52] U.S. Cl. ........................................... 209/152
[51] Int. Cl. ........................................... B07b 5/00
[50] Field of Search .................................. 209/95,
115, 120, 294, 295, 298, 299, 152

[56] References Cited
UNITED STATES PATENTS

| 3,208,591 | 9/1965 | Branchla | 209/152 X |
| 801,141 | 10/1905 | Erickson | 209/295 X |
| 3,259,241 | 7/1966 | Hughes | 209/95 X |

Primary Examiner—Richard A. Schacher
Attorney—Louis F. Kline, Jr.

ABSTRACT: An apparatus for removing extraneous vegetable matter from vegetable products such as Brussels sprouts comprising an inclined rotary drum having an internal arrangement which allows the products to be subjected to an airstream a number of times during their passage through the drum.

Robert Ernst Carl Herbert Tiepel
INVENTOR.

BY *Louis A. Kline, Jr.*
His Attorney

APPARATUS FOR THE TREATMENT OF VEGETABLES The invention relates to apparatus for the treatment of vegetables and particularly to the removal of unwanted parts such as plant debris and outer leaves, generally referred to as extraneous vegetable matter, from these vegetables. The invention is concerned with the treatment of various types of vegetables such as brussels sprouts, peas, various kinds of beans and precut curly kale.

In providing a new machine for the above purpose the invention is concerned with providing adequate removal of extraneous vegetable matter from the vegetable plant without causing excessive product damage and with provision of a machine of relative mechanical simplicity and hence reliability.

Accordingly the present invention provides an apparatus for the treatment of vegetables comprising an inclined rotary drum defining an axial passage therein along which the vegetables can pass down through the drum, gas flow means for blowing extraneous vegetable matter from the vegetables as they pass along said axial passage, and a series of inwardly directed annular partitions dividing the interior of the drum into a series of annular compartments around said axial passage, the drum being provided with lifting means whereby successively vegetables in each annular compartment are carried upwardly by rotation of the drum and are then allowed to fall into a lower annular compartment so progressing axially down through the drum.

This apparatus enables the vegetables during their passage through the drum to be subjected to the gas flow a number of times thereby providing an efficient removal of the extraneous vegetable matter.

Preferably the annular partitions are each in the form of an upwardly directed truncated cone. This arrangement gives rigidity to the partitions and also assists in trapping the vegetables as they drop from one annular compartment to a lower one.

Preferably the truncated cone of each annular partition has a base angle which is substantially the same as the angle of inclination of the drum. With this arrangement the annular partition is, at the bottom, vertically upstanding and thereby there is minimum interference with the vegetables as they drop down, or shower, from one compartment to the next.

Preferably the height and spacing of the partitions should be such that the inner edge of each partition is, at the top, vertically above the bottom of the adjacent lower annular compartment, i.e., a vertical line from the inner edge of a partition at the top falls within the space bounded by the bottom of that partition and the lower adjacent partition. This measure ensures that a vegetable when dropping from one annular compartment will satisfactorily fall into the next adjacent compartment below it.

The lifting means preferably comprises a plurality of inwardly directed baffles located within each of the annular compartments. These inwardly directed baffles should be located at an angle which provides maximum lift in dependence of the direction of rotation of the drum.

Preferably the gas flow means should be arranged to direct gas in an axial direction upwardly through the drum. The gas flow should be as nonturbulent as possible and a convenient method of achieving this is by provision of a honeycomb grid at the lower end of the drum.

Rates of gas flow, size of the apparatus and rate of rotation of the drum are dependent on the particular vegetables being treated. These should be selected so that the drag force due to the gas stream will carry away the light unwanted parts, i.e., the extraneous vegetable matter, while the main part of the vegetable progresses down the drum through the action of gravity after each lifting operation.

An embodiment on the invention will now be described by way of example with reference to the accompanying diagrammatic drawings in which.

Figure 1:
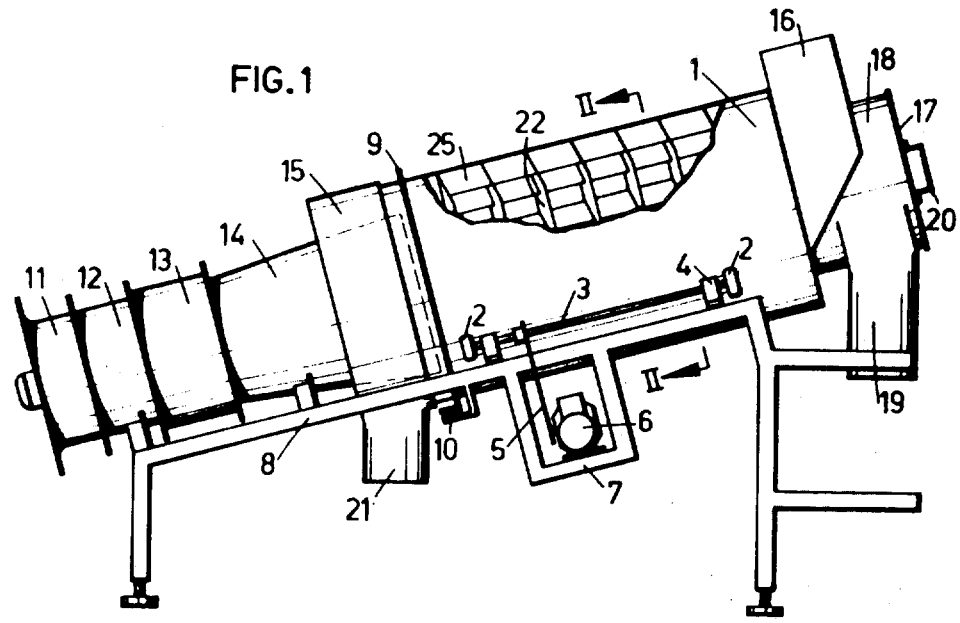
FIG. 1 shows a side view of a preferred embodiment of the apparatus according to the invention, part of the drum having been cut away to allow a view in the interior of the drum.
Figure 3:
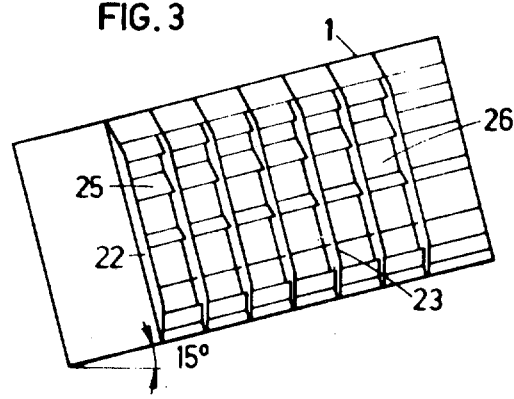
FIG. 3 shows a view of part of the inner wall of the drum.
Figure 2:
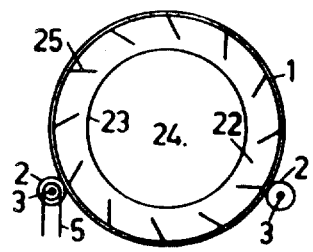
FIG. 2 shows a cross section of the drum and its drive mechanism according to the line II—II of FIG. 1.

The drum 1 shown in FIG. 1 is rotatably mounted on supporting rolls 2 provided on both sides of the drum, each pair of said rolls being mutually connected by means of a shaft 3, journaled in bearing housing 4. One of the shafts 3 is driven by means of a driving belt or chain 5 by the motor 6, mounted on a bracket 7, said bracket forming part of a supporting frame 8. The drum 1 is placed on this supporting frame 8 at an angle of 15° to the horizontal, and is open ended. Around the outer wall of the drum 1 a collar 9 is attached, against which a pressure roll 10 can freely rotate. An axially positioned blowing fan 11 is provided adjacent the lower end of the drum 1 for forcing an airflow through the drum. Behind the outlet of the fan 11 are successively placed an adjustable butterfly valve 12, a honeycomb 13 and a diffuser 14, which diffuser forms one whole with a sleeve 15. The diffuser opens freely into the rotatable drum. The higher end of the drum carries a chamber 16, intended for feeding the products to be treated. This chamber 16 forms one whole with the air outlet 18, closed by a perforated plate 17. At the lower end of the drum a discharge chute 21 is provided. A number of annular members—in the preferred construction amounting to 7—are firmly secured with their outer edges, parallel to each other and perpendicular to the axis of the drum, to the inner wall of the drum, thus forming annular partitions 22 which define a plurality of annular compartments, the inner edges 23 of the partitions 22 leaving an axial passage 24 in the drum. These annular partitions 22 are equally spaced and each possesses the shape of the surface of a truncated cone with a base angle of 15°, i.e., equal to the angle of inclination of the drum 1. A number of inwardly directed longitudinal plates 25—in the construction shown amounting to 12—are firmly secured along one of their longitudinal edges to the inner wall of the drum and extend from the product feeding end of the drum up to the last annular partition at the lower end of the drum, so that all the annular partitions 22 are intersected by the longitudinal plates 25 so as to form lifting baffles within each of the annular compartments. The lifting baffles formed by the longitudinal plates 25 are at an angle of 60° to the wall of the drum and are sloping with the direction of rotation of the drum so as to provide maximum lift to the product during rotation of the drum.

The working of the apparatus according to the invention is as follows:

The drum 1 is set rotating by the motor 6, the rate of rotation being fixed at 4 r.p.m. such a slow speed being used in order to minimize the effects of centrifugal forces. The blowing fan 11 simultaneously forces an airflow through the drum from the lower end to the higher end of this drum. In this operation the airflow moves through the axial passage 24 defined by the annular partitions 22. The air velocity can be adjusted by means of the adjustable butterfly valve 12. Owing to the high speed of the blades of the fan 11 and the influence of the butterfly valve 12 the airflow would tend to be in a state of high turbulence. For the purpose for which the apparatus according to the invention is intended, viz repeatedly subjecting the products to be treated to the airflow, during which they also move in the direction of the outlet, it has appeared desirable for the velocity of the airflow, measured over the cross section of channel 24, to be as constant as possible. This condition is realized by using a honeycomb grid 13 with the diffuser 14 connected behind it, which cause the whirling airflow to be levelled off. Besides, the aerodynamic properties are improved by the effect of the honeycomb grid 13 to such an extent that no backflow is created along the "wall" of the open channel 24, thus avoiding any venturi effect. One advantage of this is that no special arrangements are required to prevent air leakage between the diffuser 14 and the rotating drum 1. The product to be treated, for example harvested and trimmed Brussels sprouts, is fed into the interior of the drum 1 near the higher end of the drum 1 via the feeding chamber 16. During their feeding the sprouts immediately come into contact with the airflow, resulting in that the lighter contaminations are blown away, the airflow escaping via the air outlet 18 and the perforated plate 17, and the lighter contaminations are discharged via the discharge chute 19. The sprouts and the heavier contaminations, including the outer leaves, fall towards the "bottom" of the drum into the first annular compartment, are lifted during rotation of the drum by one of the baffles formed from the oblique longitudinal plates 25 up to a point near the highest point when they fall out of the annular compartment and are subjected to a free fall through the airstream. Owing to the presence of the annular partitions 22, their shape and the slope of the drum, the sprouts during their free fall will land behind the next partition, i.e., in the adjacent lower annular compartment. Again the sprouts are lifted by one of the baffles and the movement is repeated. It will be clear that the sprouts and their outer leaves, struck loose by their fall, are again and again subjected to the airflow, the leaves being carried along to the discharge chute 19. In short the treatment of the sprouts is such that in their direction of movement from the higher end to the lower end of the drum they move in a retarded motion against the airflow, during which both the airflow and the rolling of the sprouts along each other, along the rotating inner wall and along the various partitions, ensure that thoroughly cleaned sprouts are discharged at the lower end of the drum via the discharge chute 21.

In the description of the drum it was already observed that the annular partitions 22 each have the shape of a truncated cone with a base angle of 15°. Being frustoconical in an upward direction gives the partitions rigidity and ensures that the products are caught in successive compartments; and the correct base angle reduces the effect of the products colliding against the sharp inner edge 23 of the partitions 22 at the end of each free fall. Such risk of damage can be further minimized by providing rubber strips on the partitions 27 and the plates 25. In addition there must be a particular relation between the height of the conical surface formed by each of the annular partitions and the minimum distance between two successive partitions, since for a good working of the drum it is required that in its free fall the product lands before the next partition. (Since it would be inefficient if in the process one compartment would be passed over, or if the product would constantly remain in the same ring of compartments). This condition can only be reached if the vertical, touching the inner edge 23 of a partition 22, crosses the lower wall of the drum within the distance from this partition to the next i.e., it falls within the adjacent lower annular compartment.

The most favorable results with the apparatus according to the invention are obtained if care is taken that the feeding speed of the product is as regular as possible and the amount of the product to be fed is as uniform as possible, even though use of a rotating drum causes an uneven feeding flow to be converted into a more uniform discharge.

Although the apparatus described above is particularly suitable for the cleaning of Brussels sprouts, experiments have shown that it is also excellently suitable for the cleaning of other vegetables, both in dry and and in wet condition, such as for example peas, various kinds of beans, and precut curly kale.

The apparatus according to the invention can of course be combined with an apparatus known per se for the size-grading of the treated products. This size-grading could also be effected by providing perforations of various dimensions in the end section of the drum wall between the last few annular partitions at the lower end of the drum.

What is claimed is:

1. Apparatus for the treatment of vegetables comprising an inclined rotary drum defining an axial passage therein along which the vegetables can pass down through the drum, gas flow means for blowing extraneous vegetable matter from the vegetables as they pass along said axial passage, and a series of inwardly directed annular partitions each in the form of an upwardly directed truncated cone having a base angle which is substantially the same as the angle of inclination of the drum and dividing the interior of the drum into a series of annular compartments around said axial passage, the drum being provided with lifting means whereby successively vegetables in each annular compartment are carried upwardly by rotation of the drum and are then allowed to fall into a lower annular compartment, so progressing axially down through the drum.

2. Apparatus according to claim 1 in which said lifting means comprises a plurality of inwardly directed baffles located within each of the annular compartments.

3. Apparatus according to claim 1 in which said gas flow means is arranged to direct gas in an axial direction upwardly through the drum.

4. Apparatus according to claim 1 in which the annular partition are so spaced that the inner edge of each annular partition is, at the top vertically above the bottom of the adjacent lower annular compartment.

5. Apparatus for the treatment of vegetables comprising an inclined rotary drum defining an axial passage therein along which the vegetables can pass down through the drum, gas flow means arranged to direct gas in an axial direction upwardly through the drum for blowing extraneous vegetable matter from the vegetables as they pass along said axial passage, and a series of inwardly directed annular partitions dividing the interior of the drum into a series of annular compartments around said axial passage and so spaced that the inner edge of each annular partition is, at the top vertically above the bottom of the adjacent lower annular compartment, the drum being provided with lifting means comprising a plurality of inwardly directed baffles located within each of the annular compartments whereby successively vegetables in each annular compartment are carried upwardly by rotation of the drum and are then allowed to fall into a lower annular compartment, so progressing axially down through the drum.

6. Apparatus for the treatment of vegetables comprising an inclined rotary drum defining an axial passage therein along which the vegetables can pass down through the drum, gas flow means arranged to direct gas in an axial direction upwardly through the drum for blowing extraneous vegetable matter from the vegetables as they pass along said axial passage, and a series of inwardly directed annular partitions dividing the interior of the drum into a series of annular compartments around said axial passage, each of said partitions having a base angle with respect to the axis of the drum which is substantially the same as the angle of inclination of the drum, the drum being provided with lifting means whereby successively vegetables in each annular compartment are carried upwardly by rotation of the drum and are then allowed to fall into a lower annular compartment, so progressing axially down through the drum.

7. Apparatus according to claim 6 in which said lifting means comprises a plurality of inwardly directed baffles located within each of the annular compartments.